May 15, 1962 H. J. MOON 3,034,843
MORGUE CART AND BODY REFRIGERATING DEVICES
Filed May 10, 1960 2 Sheets-Sheet 1
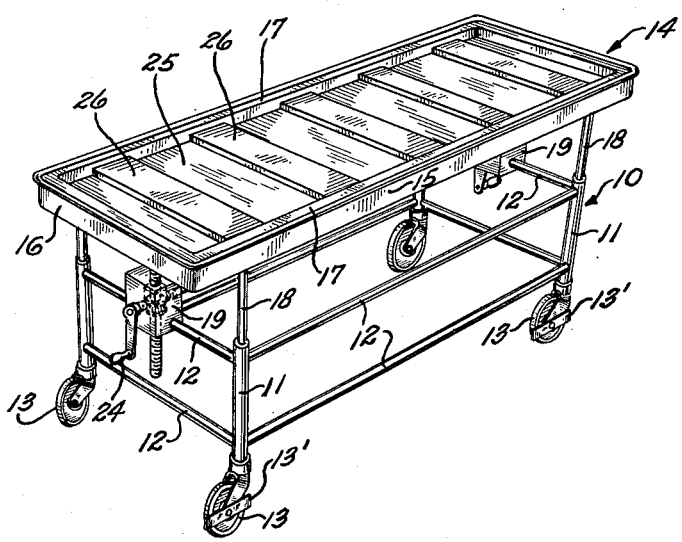
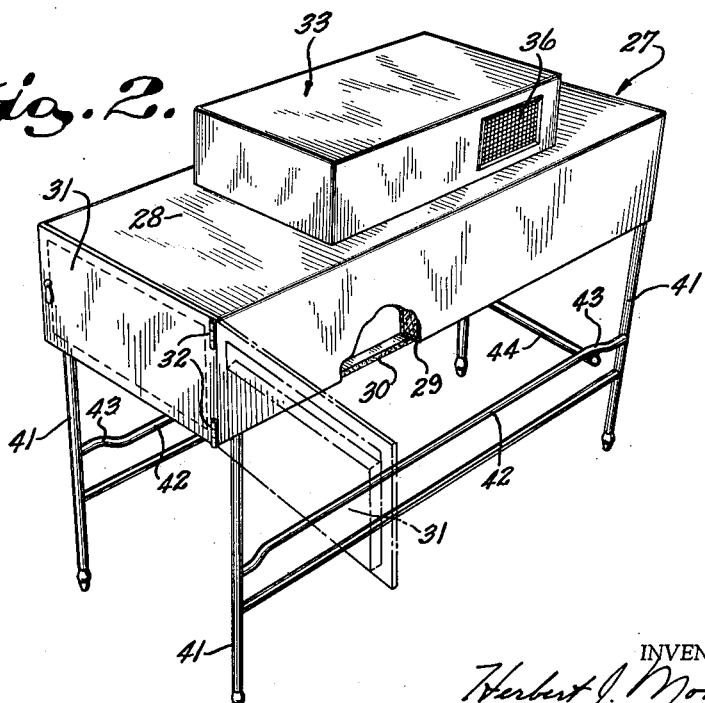
INVENTOR.
Herbert J. Moon
BY
Morsell & Morsell
ATTORNEYS.

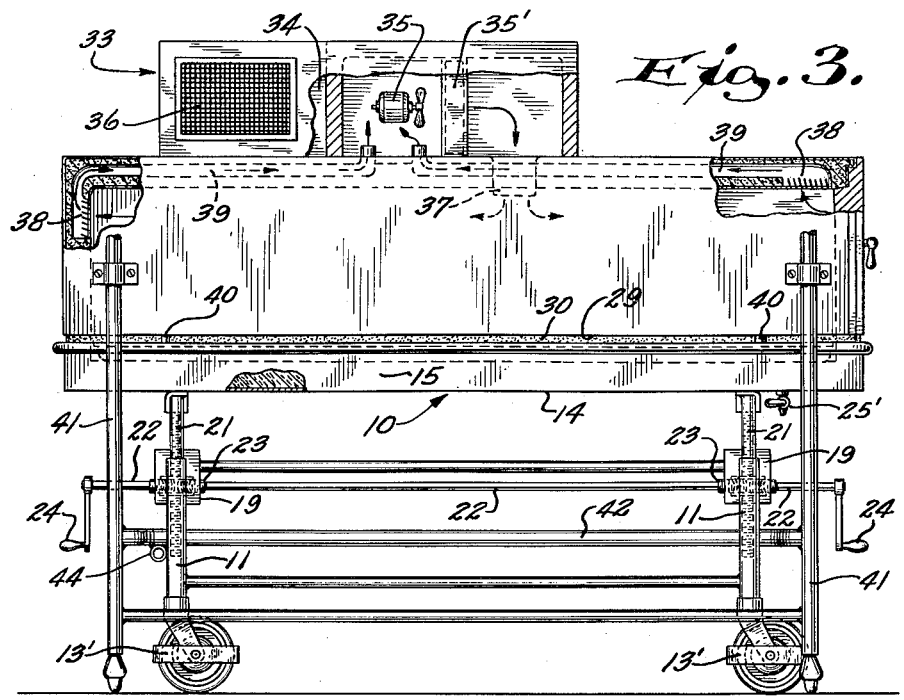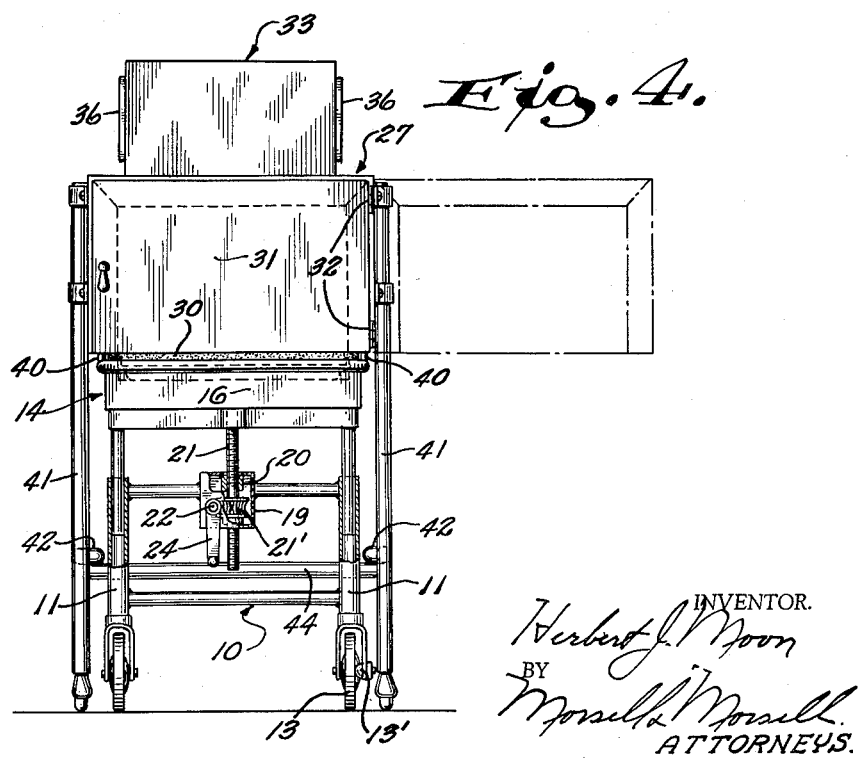

United States Patent Office 3,034,843
Patented May 15, 1962

3,034,843
MORGUE CART AND BODY REFRIGERATING DEVICES
Herbert J. Moon, Milwaukee, Wis., assignor to Lakeside Manufacturing, Inc., Milwaukee, Wis., a corporation of Wisconsin
Filed May 10, 1960, Ser. No. 28,044
8 Claims. (Cl. 312—236)

This invention relates to improvements in morgue cart and body refrigerating devices.

In hospitals, when a patient dies, it is customary to move the body to an autopsy room on a conventional hospital cart so as not to attract undue attention. When the cart with the body arrives in the autopsy room there is frequently a substantial delay before the autopsy can be performed. This is particularly true when the death occurs in the middle of the night. Heretofore some of the larger hospitals have been equipped with refrigerated compartments in which bodies can be temporarily placed. These, however, are very expensive and smaller hospitals cannot afford them.

In addition to the above, there is considerable effort required in transferring a body from a conventional hospital cart to a refrigerated vault, and in removing the body from the vault at the time the autopsy is to be performed. It is also usually difficult to transfer the body to and from an autopsy table unless there are several attendants present.

It is a general object of the present invention to provide a morgue cart and body refrigerating device including means whereby the body may be transported on a cart portion of the device from the hospital room without attracting attention, there being a refrigerator element which remains in or near the autopsy room and which can be quickly brought into use by wheeling the cart with the body under the refrigerator element and by manipulating the cart to effect a closure around the body, whereby the body may be kept in a refrigerated condition for a desired length of time without transfer from the transporting unit.

A further object of the invention is to provide a device as above described wherein the cart portion has a body receiving table which is vertically adjustable so that it may be raised to a sealing position with respect to the bottom of the refrigerator unit, the vertical adjustment of the table also making it possible to adjust the table to proper height for performing an autopsy on the cart without removing the body. As an alternative, if it is preferred to use the conventional autopsy table, the cart may be easily adjusted to a suitable height to simplify transfer of the body to the autopsy table.

A further object of the invention is to provide a device as above described having cooperable means between the cart portion and refrigerator portion for insuring proper positioning of the cart portion beneath the refrigerator portion whereby when the table is elevated there will be perfect registration between the rim of the table and the lower margin of the hood to effect a sealed closure.

With the above and other objects in view, the invention consists of the improved morgue cart and refrigerating device, and all of its parts and combinations, as set forth in the claims, and all equivalents thereof.

In the accompanying drawing, in which the same reference numerals designate the same parts in all of the views:

FIG. 1 is a perspective view of the cart portion of the invention;

FIG. 2 is a perspective view of the refrigerator portion, the dot and dash lines showing the door in opened position;

FIG. 3 is a side elevational view showing the cart and refrigerator portions in sealed operative position relative to one another, parts being broken away and shown in vertical section; and FIG. 4 is an end view of the structure of FIG. 3 looking at the left hand end thereof.

Referring more particularly to the drawing, the cart portion is designated generally by the numeral 10. It includes a lower frame portion comprising tubular legs 11 which are connected by horizontal frame members 12, the legs having casters 13 on their lower ends and the tubular legs being open at their upper ends. Two of these casters may be equipped with rotatable cam locks 13' as are well known, which are manually rotatable to and from wheel braking position. The table portion 14 is preferably in the form of a shallow metal pan having sides 15 and ends 16 with outwardly directed flanges 17. Depending from the bottom of the table are rods 18 which are located to fit in the upper ends of the tubular leg members 11 so as to become telescopically associated therewith to permit raising and lowering of the table in a manner to be hereinafter described. Any other suitable mechanism may be employed for guiding the table during said raising and lowering movement.

Supported on the upper end frame members 12 of the base are blocks 19. Within each block is a rotating nut portion 20 (see FIG. 4) for receiving a screw 21. The upper end of each screw is suitably fastened on the underside of the table. Below the nut and attached thereto for rotation therewith and within each block is a worm gear 21'. A rod 22 extending horizontally through each block carries a worm 23 which is in engagement with the worm wheel. Each rod has an outer end crank 24. It is thus apparent that by rotating either crank 24 both of the worms 23 are rotated to cause rotation of the worm wheels 19 and nuts 20 to effect a movement of the screws 21 in a selected direction to raise or lower the table.

Where the table is of a design to permit autopsies to be performed directly on it, as is shown, it is preferred that the table be recessed as at 25 and have loose transverse slats 26 on which the body is adapted to be supported and there may be a drain cock 25', the bottom of the pan being insulated. However, the table may also be a conventional flat metal top properly insulated for use as the bottom of the refrigerator.

The refrigerator element is illustrated alone in FIG. 2 and is designated generally by the numeral 27. It includes a rectangular hood 28 having an open bottom surrounded by a marginal edge 29. Secured to the lower face of the marginal edge is a gasket 30 of rubber or other suitable resilient sealing material. At one end of the hood is a door 31 which is preferably hinged at a side as at 32 to swing to open positon as shown by dot and dash lines in FIG. 2. The walls of the hood 28 as well as the door may be suitably insulated as is common in refrigerators.

The refrigerator element has four legs 41, the legs being suitably connected by side braces. Also extending between the legs on each side are guiding rails 42. At the door end of the device the entrance end of the rails have bent ends as at 43 to provide an entrance flare to more readily receive the cart. At the opposite end there is a transverse stop bar 44.

Mounted on top of the hood is a refrigeration unit 33 which may be a box with a compartment or chamber 34 for the compressor, there being air admitting grills 36 on each side of the compressor chamber. Another compartment includes the fan 35 and evaporator 35'. Any suitable refrigerating unit may be utilized. Cold air from the refrigerating unit is adapted to be discharged through a conduit 37 which extends transversely across the hood intermediate the length thereof. Return air from within the hood is adapted to enter louvered openings 38 to pass through conduits 39 back into the fan chamber.

In use of the device it is convenient to keep the refrigerator portion 27 of FIG. 2 in or near the autopsy room. The separated cart in the form of FIG. 1 may then be moved to the hospital room to receive the body. The cranks 24 may be manipulated to adjust the table to a convenient height to remove the body from the bed. Inasmuch as the cart looks practically the same as an ordinary hospital cart, it will not attract any undue attention in the hospital halls.

The body is then taken to the autopsy room and the cart in a relatively lowered position is rolled endwise between the legs 41 of the refrigerator member, the spacing between the legs of the cart being less than the spacing between the legs of the refrigerator member, as shown in FIG. 4.

When the cart is wheeled between the legs of the refrigerator unit it will be guided by the rails 42 until stopped by the stop bar 44. These rails and stop bar are so located that the cart will be perfectly centered beneath the hood so that the gaskets 30 will seat perfectly against the rim 17 of the table. After the cart with the body thereon is beneath the hood the door 31 is closed and the table of the cart is elevated to bring the rim 17 of the cart into engagement with the sealing gasket 30 on the lower margin of the hood and door.

In order to prevent cranking so far that the gasket 30 is damaged, there are spaced stops 40 which project from the margin 29 of the hood (see FIG. 4) and are engaged by the rim 17 of the cart after the gasket has been slightly compressed to provide the proper seal. These stops are preferably of metal or other strong material and make it possible, if desired, to continue cranking the table upwardly so as to lift the legs of the refrigerator element off of the floor. The entire unit of FIG. 4 may then be moved to a new location on the wheels of the cart. With the refrigerating unit 34 turned on, it is apparent that there is no need to immediately perform an autopsy as this may be done in the morning or at any convenient time.

When it is desired to perform the autopsy, the door 31 is opened, the cart top lowered, and the cart withdrawn. The autopsy may then be conveniently performed on the cart (if it is in the pan form of FIG. 1) without removing the body, or on an autopsy table, as desired. In the latter case, the top of the cart may be easily adjusted to proper height to facilitate transfer of the body to and from the autopsy table. Where the cart is used as an autopsy table the caster locks 13' should be swung to locking position to prevent rolling of the cart, and this may also be done at other times to prevent undesired movement of the table, such as when a body is being transferred to or from it.

It is to be understood that the present invention is not to be limited to the exact details of construction shown and described for obvious modifications will occur to persons skilled in the art.

What is claimed is:

1. In combination a refrigerated hood having an open bottom with a surrounding bottom margin, legs supporting said hood with its bottom margin spaced upwardly a substantial distance above the floor, there being an access space between at least two of said legs a wheeled cart having a body supporting table top which is lower than said bottom margin of the hood when the parts are in inoperative position relative to one another, said table top being of a size to form a bottom closure for said open bottom of the hood when in operative position between the legs of said hood, guiding means on said legs of the hood located to coact with portions of said cart to accurately guide said cart to proper position beneath said hood while said cart is being moved horizontally into said access opening from an external position to a position beneath said hood and between said supporting legs, and means for causing relative vertical movement between said two elements to bring them into operative position relative to one another where said table top closes said open bottom of the hood with the body confined within the hood.

2. In combination, a refrigerated hood having depending walls with a bottom margin surrounding a bottom opening, means supporting said hood with its bottom margin spaced upwardly a substantial distance above the floor, said means providing an access opening on one side, a wheeled cart having a body supporting table top mounted for vertical elevating movement from an inoperative lowered position lower than said bottom margin of the hood to a raised operative position, said table top being of a size to form a bottom closure for said open bottom of the hood when in said operative position thereunder, means for raising and lowering said table top, and a door in one of said depending walls of the hood of a size to admit a body on said table as the wheeled cart is being moved horizontally through said access opening to an upwardly projecting position beneath said hood.

3. A morgue cart and refrigerating device comprising in combination, a refrigerator element having an open bottom, means supporting said refrigerator element with its bottom spaced upwardly a substantial distance above the floor, said means providing an access opening on one side, a wheeled cart of a size to be movable horizontally through said access opening and having a body supporting table mounted for vertical movement to and from an inoperative position where it is lower than the bottom of said refrigerator element, said refrigerator element and table being of such size and so shaped as to cooperate in forming a closed refrigerating compartment when said table is elevated to operative position beneath and in engagement with said refrigerator element, and means for causing raising and lowering movement of said table.

4. In combination, an elongated rectangular refrigerated hood having an open bottom with a surrounding margin and having ends and sides, corner legs supporting said hood with its bottom margin spaced upwardly a substantial distance above the lower ends of the legs, a wheeled cart having a vertically movable table top of a size to form a bottom closure for said open bottom of the hood, said cart being narrower than said hood whereby the cart may be rolled between legs of said hood at an end thereof to a position beneath said hood, said last end of the hood having a door for receiving a body on said table which projects above said bottom margin of the hood as the cart is being moved to position, the lower margin of said door being normally above the table top and means for raising and lowering said table top.

5. In combination, an elongated rectangular refrigerated hood having an open bottom with a surrounding margin and having ends and sides, corner legs supporting said hood with its bottom margin spaced upwardly a substantial distance above the lower ends of the legs, a wheeled cart having a vertically movable table top of a size to form a bottom closure for said open bottom of the hood, said cart being narrower than said hood whereby the cart may be rolled from an external position between legs of said hood at an end thereof to a position beneath said hood, side rails on said hood legs positioned to coact with portions of the cart to guide it into proper position, a stop carried by legs at one end of the cart to limit inward movement of the cart, and means for raising and lowering said table top to a position to seal against the bottom margin of the hood.

6. In combination, a refrigerated hood having an open bottom with a surrounding margin, legs supporting said hood with its bottom margin spaced upwardly a substantial distance above the lower ends of the legs, a wheeled cart having a vertically movably mounted table top of a size to form a bottom closure for said open bottom of the hood, said table top having a surrounding margin of a size and shape to register with the bottom margin of the hood, there being a clear space between one pair of legs of the hood which is greater than the corresponding dimension of the cart whereby said cart may be rolled from an external position into said space between said legs to locate the table top in proper position beneath said hood, said table top being of less height than said bottom margin of the hood when said table top is in a lowered condition, and means for raising and lowering said table top to bring the rim of the table top into and out of sealing engagement with the bottom margin of the hood.

7. In combination, a refrigerated hood having an open bottom with a surrounding margin, legs supporting said hood with its bottom margin spaced upwardly a substantial distance above the lower ends of the legs, a wheeled cart having a vertically movably mounted table top of a size to form a bottom closure for said open bottom of the hood, said table top having a surrounding margin of a size and shape to register with the bottom margin of the hood, there being a clear space between one pair of legs of the hood which is greater than the corresponding dimension of the cart whereby said cart may be rolled from an external position into said space between said legs to locate the table top in proper position beneath said hood, cart locating means on said legs for guiding said cart to said proper position, said table top being of less height than said bottom margin of the hood when said table top is in a lowered condition, a door in said hood positioned to receive an upwardly projecting body on the table top as the cart is being moved into said space, and means for raising and lowering said table top to bring the rim of the table top into and out of sealing engagement with the bottom margin of the hood.

8. In combination, a refrigerated hood having an open bottom with a surrounding margin, legs supporting said hood with its bottom margin spaced upwardly a substantial distance above the lower ends of the legs, a wheeled cart having a vertically movably mounted table top of a size to form a bottom closure for said open bottom of the hood, said table top having a surrounding margin of a size and shape to be adapted to register with the bottom margin of the hood, there being a clear space between one pair of legs of the hood which is greater than the corresponding dimension of the cart whereby said cart may be rolled horizontally from an external position into said space between said legs to position the table top beneath said hood, said table top being of less height than said bottom margin of the hood when said table top is in lowered position, a door in said hood positioned to receive an upwardly projecting body on the table top as the cart is being moved into said space, and means for raising and lowering said table top to bring the rim of the table top into and out of sealing engagement with the bottom margin of the hood and to lift said hood to a position where its legs are out of contact with the floor whereby the hood may be transported on the cart when desired.

References Cited in the file of this patent

UNITED STATES PATENTS

| | | |
|---|---|---|
| 353,546 | Ellis | Nov. 30, 1886 |
| 2,014,244 | Bramlett | Sept. 10, 1935 |
| 2,053,520 | Eisenmann | Sept. 8, 1936 |
| 2,083,259 | Ginter | June 8, 1937 |
| 2,506,448 | Gregor | May 2, 1950 |
| 2,515,336 | Christie | July 18, 1950 |
| 2,654,897 | Knopf | Oct. 13, 1953 |

FOREIGN PATENTS

| | | |
|---|---|---|
| 452,700 | France | May 21, 1913 |